United States Patent [19]
Dommer et al.

[11] Patent Number: 4,801,349
[45] Date of Patent: Jan. 31, 1989

[54] APPARATUS FOR BUTT-WELDING PLASTIC PIPE SECTIONS OR PLASTIC FITTINGS

[76] Inventors: Armin Dommer, Eichweg 13; Dieter Dommer, Bahnhofstrasse 5, both of 7257 Ditzingen 1, Fed. Rep. of Germany

[21] Appl. No.: 109,110

[22] Filed: Oct. 16, 1987

[30] Foreign Application Priority Data

Oct. 30, 1986 [DE] Fed. Rep. of Germany ....... 3636891

[51] Int. Cl.$^4$ ............................................. B29C 65/20
[52] U.S. Cl. .................. 156/503; 156/158; 156/304.2; 156/304.6; 156/507
[58] Field of Search ............... 156/158, 304.2, 304.6, 156/502, 503, 507

[56] References Cited

U.S. PATENT DOCUMENTS

| | | | |
|---|---|---|---|
| 3,022,209 | 2/1962 | Campbell | 156/158 |
| 3,635,504 | 1/1972 | Borden et al. | 156/158 |
| 3,660,192 | 5/1972 | Smith et al. | 156/304.6 |
| 3,666,586 | 5/1972 | Lacey | 156/304.6 |
| 4,636,272 | 1/1987 | Riggs | 156/158 |
| 4,675,965 | 6/1987 | Offringa et al. | 156/304.2 |

FOREIGN PATENT DOCUMENTS

2923205 12/1980 Fed. Rep. of Germany .

Primary Examiner—Michael Wityshyn

[57] ABSTRACT

The invention is a method and apparatus for butt-welding two adjoining plastic tubular members which are held in axially adjustable mountings and which are joined together under axial pressure after heating in the area of their juncture by means of electric heating elements. Welding without formation of an interior bead is made possible with the invention by inserting into the plastic tubular members, prior to heating, a bolster which bridges the juncture and fits flush against the inside curvature of the plastic tubular members, and by applying in the area of the juncture shell-shaped heating elements to the outside of the plastic tubular members to heat the abutting ends of the plastic tubular members from the outside.

9 Claims, 1 Drawing Sheet

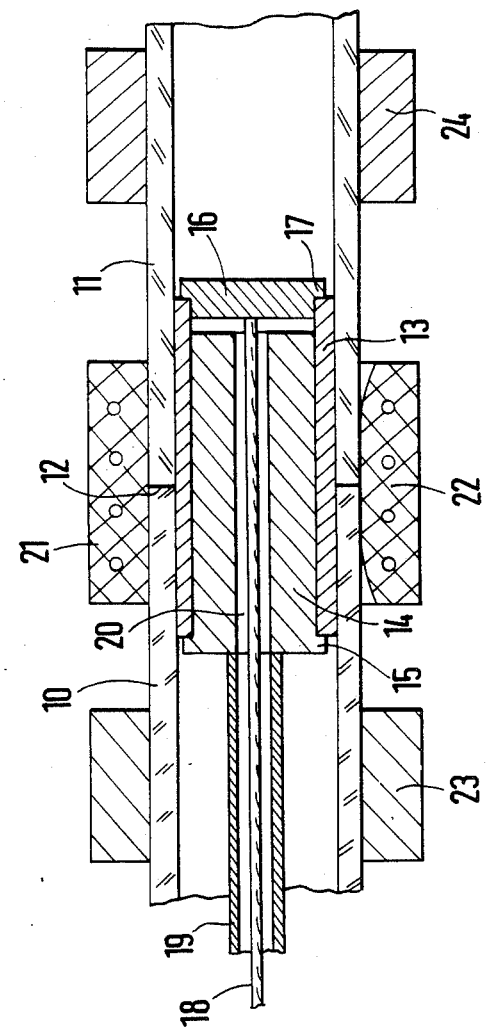

APPARATUS FOR BUTT-WELDING PLASTIC PIPE SECTIONS OR PLASTIC FITTINGS

FIELD OF THE INVENTION

This invention is related generally to the joining of tubular members in end-to-end fashion and, more particularly, to methods and apparatus for butt welding of plastic pipe sections and/or plastic fittings.

BACKGROUND OF THE INVENTION

This invention involves a method and apparatus for butt-welding two facing and adjoining plastic pipe sections or plastic fittings (hereafter sometimes referred to as "tubular members") which are supported in axially adjustable expansion devices and joined together under axial pressure after heating in the vicinity of the juncture by means of electric heating elements.

There are known methods and apparatus whereby the facing sides of plastic tubular members, which are to be joined, are heated simultaneously by means of a plate-shaped heating element inserted in between. The heating element is swung out after heating, and the headed faces of the plastic tubular members are moved axially and brought together under pressure so that they are joined together. The facing sides, which have been softened, are pushed into each other and deformed, so that a bead is formed at the joint, on both inside and outside. As a result, the inside bead constricts the diameter in the area of the joint, which is often undesirable if not detrimental.

OBJECTS OF THE INVENTION

It is the object of this invention to provide a method and apparatus of the type first discussed by which plastic tubular members may be welded together flush without forming an interior bead in the area of the joint.

SUMMARY OF THE INVENTION

The method of this invention solves the aforementioned problem by inserting into the plastic tubular members, prior to heating, a bolster which bridges their juncture and provides support which is flush against the inside curvature of the plastic tubular members, and by applying shell-shaped heating elements in the vicinity of the juncture to the outside of the plastic tubular members to heat the adjoining terminal sites of the plastic tubular members from the outside.

The bolster prevents formations of an inside bead when the plastic tubular members are joined together under pressure. It has been shown that applying heat even from the outside sufficiently heats the ends of the tubular members, which are to be joined, in such a way that they are softened through their entire thicknesses. This is a necessary if welding is to occur throughout such entire thickness.

If a set-up calls for securing the plastic tubular members together under constant pressure during heating, then heating and welding progress concurrently. If, however, the intention is to join the plastic tubular members under pressure after heating, then welding occurs after heating. In both cases excellent welds may be attained if the heating time and pressure are selected according to the plastic tubular members to be joined.

A simple device for practicing the method of this invention includes a tube section, of heat-resistant material, which is used as a bolster, such bolster tube being held against the inside curvatures of the plastic tubular members by means of an adjusting device, and heating elements which are formed as two half-shells and completely enwrap the plastic tubular members.

The bolster tube may be made, for example, of polytetraflouroethylene, a material known by the trademark Teflon (a trademark of E.I. duPont de Nemours, of Wilmington, Del. so it is not damaged under the temperatures which are generated and so it does not attach itself to the plastic tubular members. The two half-shell heating elements are fitted to the outside diameter of the plastic tubular members in the area of their juncture and enwrap these parts completely so that heating takes place uniformly over the entire circumference of such parts.

The bolster tube is held against the inner curvature of the plastic tubular members by inserting into the bolster tube a core member which supports the inside curvature of the tube section. The core member has a flange which supports the core member by engagement with one end of the bolster tube. Inserted into the other end of the bolster tube is a set-plate having an attachment collar. The set-plate is adjustable relative to the core member by means of a Bowden cable. By means of the axial stress which is imposed, the bolster tube is deformed and provides support against the inner walls, since the core member prevents an inward displacement.

In order to insert the bolster tube easily into the plastic tubular members, the inner diameters of the core member flange and set-plate attachment flange are the same, and such diameter is smaller than the inside diameter of the plastic tubular members and larger than the inside diameter of the bolster tube.

Sufficient adjusting play for the set-plate is obtained simply by having the core member extend to the set-plate, less an adjustment play allowance, without detracting from support of the bolster tube inside walls.

Adjustment with respect to the set-plate is best achieved by connecting the set-plate with the adjusting line of the Bowden cable and carrying the adjusting line through a bore hole in the core member and by connecting the guide tube of the Bowden cable to the core member.

Concentration of the heating effect on the joint is achieved by convex shaping of the heating element heating surfaces which are against the plastic tubular members; such convexity is in longitudinal cross-section. In this way formation of beads at the abutting edges of the heating elements can also be avoided.

BRIEF DESCRIPTION OF THE DRAWING

The invention is explained in greater detail in the drawing which is a sectional view taken along the axis of a pair plastic tubular members being butt welded using the method and apparatus of this invention.

DETAILED DESCRIPTION OF PREFERRED EMBODIMENTS

The plastic tubular members 10 and 11, which are to be joined, are secured in two mounting devices 23 and 24. At least one of mounting devices 23 and 24 is axially adjustable and provides the pressure necessary for welding. This pressure may continue during and after heating or may be applied only after heating.

Before plastic tubular members 10 and 11 are brought together into the welding position, a Bowden cable, including an adjusting line 18 and a guide tube 19, is inserted into tubular member 10. Guide tube 19 is connected to a core member 14 which is inserted into a bolster tube 13 and which supports itself at one end of bolster tube 13 by means of a flange 15. Bolster tube 13, which is preferably made of polytetraflouroethylene (for example, Teflon as identified above), is inserted into plastic tubular member 10 until it protrudes about halfway out. When plastic tubular member 11 is brought into welding position, bolster tube 13 bridges the juncture 12, as clearly shown in the drawing.

The other end of bolster tube 13 is taken up by a set-plate 16 which is engaged with a peripheral flange 17 at the such end of bolster tube 13. Core member 14 is thereby initially positioned a given distance away from set-plate 16, which determines the maximum adjustment play. Set-plate 16 is connected with adjusting line 18 of the Bowden cable, which extends through a bore hole 20 in core member 14, while guide tube 19 of the Bowden cable is fixed securely to core member 14. When line 18 is pulled, set-plate 16 moves toward core member 14 and axially compresses bolster tube 13. Since core member 14 is braced against the inside curvature of bolster tube 13, bolster tube 13 can only expand in the direction toward the inside walls of plastic tubular members 10 and 11, thus supporting themselves thereagainst.

Heating the ends of plastic tubular members 10 and 11 takes place from the outside by way of two half-shell formed heating elements 21 and 22, which completely enwrap plastic tubular members 10 and 11 near juncture 12. The inside diameter of heating elements 21 and 22 is made to match the outside diameter of plastic tubular members 10 and 11.

In order that flange 15 of core member 14 and flange 17 of set-plate 16 not impede easy insertion of bolster tube 13 into plastic tubular members 10 and 11, the diameters of flanges 15 and 17, which are equal in size, are smaller than the inside diameter of plastic tubular members 10 and 11, but larger than the inside diameter of bolster tube 13. The latter condition is necessary because flanges 15 and 17 must be firmly placed at the ends of bolster tube 13 in order to achieve axial expansion of bolster tube 13.

As the drawing of heating element 22 illustrates, the contact surface of heating element 22 may be convex in axial cross-section in order to concentrate the heating effect in the area of juncture 12 and to avoid the formation of a bead at the edges of heating element 22.

While the principles of this invention have been described in connection with specific embodiments, it should be understood clearly that these descriptions are made only by way of example and are not intended to limit the scope of the invention.

What is claimed:

1. In a device for butt-welding two plastic tubular members at the juncture of their abutting ends of the type including means to support such members in axially adjustable position, means to apply axial pressure of one abutting end on the other, and electric heating elements to apply heat in the vicinity of the juncture, the improvement comprising:
   a bolster tube inside the plastic tubular members, said bolster tube bridging the juncture and flush with the inside curvature of the plastic tubular members;
   means to adjustably apply pressure on the inside curvature through the bolster tube; and
   a pair of shell-shaped heating elements configured and arranged to contact and enwrap the outside curvature of the plastic tubular members near the juncture, said heating elements having heating contact surfaces which are convex in longitudinal cross-section.

2. The device of claim 1 wherein the bolster tube is made of polytetrafluoroethylene.

3. In a device for butt-welding two plastic tubular members at the juncture of their abutting ends of the type including means to support such members in axially adjustable position, means to apply axial pressure of one abutting end on the other, and electric heating elements to apply heat in the vicinity of the juncture, the improvement comprising:
   a bolster tube inside the plastic tubular members, said bolster tube bridging the juncture and flush with the inside curvature of the plastic tubular members;
   means to adjustably apply pressure on the inside curvature through the bolster tube, including: a core member inserted into one end of the bolster tube, said core member buttressing the inside of the bolster tube and having a flange engaging said one end of the bolster tube; a set-plate inserted into the opposite end of the bolster tube and having an attachment flange engaging said opposite end; and means to adjust the position of the set-plate with respect to the core member; and
   a pair of shell-shaped heating elements configured and arranged to contact and enwrap the outside curvature of the plastic tubular members near the juncture.

4. The device of claim 3 wherein the adjusting means comprises a Bowden cable.

5. The device of claim 4 comprising:
   a guide tube connected to the core member to receive the adjusting line of the Bowden cable; and
   the set-plate being connected with the line of the Bowden cable, said line extending through a bore hole in the core member and through the guide tube.

6. The device of claim 3 wherein the flanges have outer diameters smaller than the inside diameter of the plastic tubular members and larger than the inside diameter of the bolster tube.

7. The device of claim 6 wherein the core member and set-plate are dimensioned such that there is an allowance between them for adjustment play.

8. The device of claim 7 wherein the heating elements have heating contact surfaces which are convex in longitudinal cross-section.

9. The device of claim 7 wherein the bolster tube is made of polytetrafluoroethylene.

* * * * *